Figure 1:
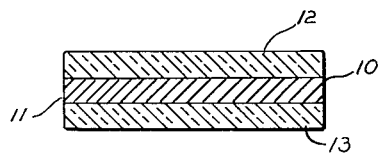

March 25, 1952  P. ROBINSON ET AL  2,590,650
ELECTRICAL CONDENSER
Filed Aug. 1, 1951

PRESTON ROBINSON
COLIN C. REID
INVENTOR.

BY *Arthur J. Connolly*

THEIR ATTORNEYS

Patented Mar. 25, 1952

2,590,650

UNITED STATES PATENT OFFICE 2,590,650

ELECTRICAL CONDENSER

Preston Robinson, Williamstown, Mass., and Colin C. Reid, Falls Church, Va., assignors to Sprague Electric Company, North Adams, Mass., a corporation of Massachusetts Application August 1, 1951, Serial No. 239,646

5 Claims. (Cl. 175—41)

Our present invention relates to improved electrical condensers. More particularly, it concerns stacked and rolled condensers having a high electrical capacity per unit of volume. This application is a continuation-in-part of our copending application Serial Number 21,248, filed April 15, 1948, now abandoned.

Rolled paper and stacked mica condensers can be and are produced in large quantities at low cost. These are satisfactory for most applications in which a condenser is required. However, for some applications it is highly desirable or even necessary to provide a condenser having greater capacity per unit of volume, than can be achieved by these conventional types.

Rolled paper condensers generally employ electrode foils of about .0002" to about .0004" thickness. The insulation for the lowest voltage ratings usually consists of two or three layers of impregnated paper of perhaps .0003" thickness each. In such condensers as well as in the stacked mica condensers a "margin" of at least .05", i. e. excess width and length of dielectric spacer, is employed, in order to reduce the possibility of breakdown between adjacent electrode foil edges. Such excess amounts of dielectric spacer material, of course, tend to limit the efficiency of such condensers, i. e., their capacity per unit of volume. This makes it impossible to produce very small units of the conventional types having adequate capacity for most purposes.

Numerous attempts have been made to produce electrical condensers of high capacity and small volume by dipping electrode foils in waxes and lacquers to produce upon cooling or removal of the solvent, an insulated foil which can be wound or stacked with other foils to produce condensers without the use of the customary, separate, dielectric spacer sheets. These attempts have been unsuccessful, principally because of the difficulty in providing uniform insulation about the edges and at the corners of the coated foils.

The electrode foils employed in highly efficient condensers must necessarily be very thin and thus have sharp edges. When coating insulation upon such a thin foil, either by dipping the latter in a solution, emulsion or suspension of the insulating material, it is found that the coating does not form uniformly about the edges and at the corners of the foil. In most cases the insulation will "pull away" at these locations, leaving an exposed or a poorly insulated foil surface. Unfortunately, it is at the edges and corners of the electrode foil, that the field strength is at its highest, so that these are the locations where breakdown is most likely to occur. In the prior attempts to employ lacquer or wax coated electrode foils, the edge difficulties have made it impractical, if not impossible, to produce small, rolled condensers with adequately insulated foil edges. If one insulates large strips of condenser foil and then punches electrode elements therefrom, in order to produce a stacked condenser, the difficulties of obtaining adequate insulation along the edges and at the corners are even greater.

It has also been attempted to insulate electrode foils with ceramic coatings. Sufficiently flexible ceramic coatings can be produced on electrode foils by electrophoretic deposition, combined with or followed by a treatment with a resin or other suitable binder. However, the difficulties in securing a uniform and durable coating along the edges and at the corners of the electrode foil are very great. Specially designed cathodes may be employed during electrophoresis to increase the deposition at the edges and corners of the foil, but even such procedures have not resulted in commercially useful, ceramic coated, electrode foils. Of course, foils so insulated are subject to the same disadvantages as the lacquered and waxed foils, when the electrode elements are punched or cut from long strips in the production of stacked condensers.

It is an object of the present invention to overcome the foregoing and related disadvantages of the prior art condensers. A further object is to produce improved rolled and stacked electrostatic condensers. A still further object is to produce small electrical condensers of relatively high capacity. Another object is to provide a simple method for insulating the edges and corners of electrode elements in stacked and rolled electrical condensers.

These objects are attained in accordance with the invention by providing an electrical condenser comprising two or more cooperating metal electrode foils, the flat surfaces of at least one of said foils being insulated with a dielectric material, and the edges of said foil being insulated with the phthalocyanine of said metal. In a more restricted sense, this invention is concerned with an electrical condenser comprising two convolutely wound, metal, electrode foils, at least one of said electrode foils being insulated on the flat surfaces thereof with a flexible, dielectric coating, and on the edges and corners thereof with an adherent layer of the phthalocyanine of the metal composing said foil. In a still more restricted sense, the invention is concerned with an electrical condenser comprising cooperating copper electrode foils, the flat surfaces of at least one of said foils being insulated with a flexible inorganic dielectric coating, and the edges and corners of said insulated foil being insulated with an adherent layer of copper phthalocyanine formed in situ. In one of its preferred embodiments, the invention pertains to an electrical condenser comprising two convolutely wound copper foils, at least one of which is insulated on the flat surfaces thereof with a coating of a polytetrahaloethylene resin, and on the edges and corners thereof with an adherent layer of copper phthalocyanine. The invention is also concerned with a novel method of producing the above and related condensers.

According to our invention, we have found it possible to produce useful, small volume, stacked and rolled condensers with adequate insulation at the edges and corners of the electrode foils by utilizing one or more specially insulated foils. Such electrode foils are produced by first coating the flat surfaces thereof with a thin layer of dielectric material according to known procedures. The so-coated electrode foils are then exposed to the vapors of a material that will react with the metal of the foil to form the phthalocyanine of such metal. Such treatment may take place either before or after the coated foils are assembled in a condenser. By this treatment all exposed and uninsulated portions of the coated foil are provided with an adherent layer of metal phthalocyanine, greater in volume than the parent metal, which possesses excellent dielectric properties and will withstand high temperatures without deterioration. A particular advantage of this treatment is that it will eliminate any flaws, such as pin holes and cracks in the original insualtion coating by the formation of the metal phthalocyanine layer wherever the foil surface is exposed.

The formation of a metal phthalocyanine layer upon the surface of a metal conductor is fully disclosed in our co-pending application Serial No. 741,888 filed on April 16, 1947, now Patent No. 2,585,037. Briefly, it involves exposure of the metal surface to the vapors of a compound selected from the class comprising phthalonitrile, phthalimide, halogenated ortho-cyano-benzonitriles and other substituted derivatives of these compounds, at a temperature between about 200° C. and about 500° C., until a metal phthalocyanine layer of the desired thickness is formed. It is preferred to employ such vapors full strength, although they may be diluted with an inert constituent such as nitrogen. In some cases a solution of the reactant in a highly boiling solvent can be employed, but generally the vapor treatment is far more desirable. The preferred temperatures for the treatment range between 300° and 400° C. Obviously, when applying this treatment to a coated electrode foil according to our invention, we select a metal for the foil that will form the phthalocyanine under such conditions and employ a dielectric coating that will withstand the temperatures employed for the period required to form the metal phthalocyanine layer. The thickness of the layer should not exceed .0005" for maximum adherence thereof to the underlying metal.

The metals which may be employed for the electrode foils are numerous. Copper, lead, aluminum and magnesium readily form phthalocyanines, when contacted under proper conditions with the vapors of phthalonitrile, phthalimide, etc. For many applications, copper is preferred, since it is an excellent conductor of electricity and can be obtained in the form of thin, flexible foils. Aluminum is also very useful, since it is inexpensive even in very thin sheets having a thickness on the order of .00025".

The dielectric layer initially provided on the flat surfaces of electric foils may be organic or inorganic, or both organic and inorganic in nature. Since the condensers of our invention have particular advantage and utility at temperatures above about 125° C., and also because of the processing conditions, high temperature resistant dielectrics are preferred. Among the suitable organic dielectric materials are polytetra fluoroethylene, polytrifluorochloroethylene, polytetrachloroethylene, and other polytetrahaloethylenes, copolymers of the various polytetrahaloethylenes such as copolymers of polytetrafluoroethylene, and polytrifluorochloroethylene, as well as copolymers of tetrahaloethylenes with other polymerizable materials, polypentachlorostyrene and its copolymers, polyamides, polymers of diisocyanates with diols or diamines, various high temperature condensation resins, and the like. These may be applied to the electrode foil by one or more of these methods: from solvent lacquers, from emulsions, from suspensions, by spraying, dipping and/or by electrophoresis. Among the suitable inorganic dielectric materials are the thin, flexible, ceramic coatings produced by electrophoresis from suspensions of ceramic particles, such as china clay, bentonite, talc, and the like, chemically and electrochemically formed metal oxide layers, inorganic paints, etc. There should also be mentioned the hydrolysis products of the aryl-, alkyl- and aralkyl-chlor-silanes, which have become known technically as the silicones or polysiloxanes. These resins are usually deposited on the foil from a solution of the partially polymerized material. Thin, flexible mixed resin and ceramic coatings may also be used. Titanium dioxide, alkaline earth titanites, china clay, talc, bentonite, mica and other ceramic type particles form particularly desirable dielectric layers when deposited with the polytetrahalo resins enumerated above, or with other high temperature condensation resins. Reference is made to the Robinson et al. Patents 2,478,322 and 2,421,652, and the Ruben Patent 2,393,068, for a more complete disclosure on acceptable "dual" type resin and ceramic coatings, and to methods of producing such coatings.

The dielectric coating preferably has a thickness of .0005" or less, in order that the electrical capacity of the finished condenser may be as high as possible, per unit of its volume.

Figure 2:
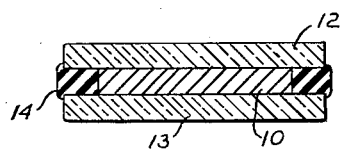
Figure 3:
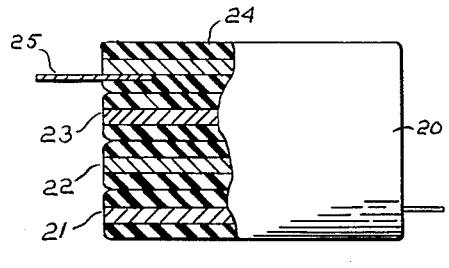
Figure 4:
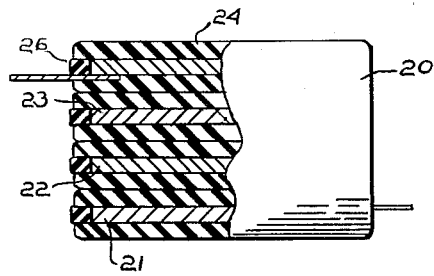

The preparation of our novel, high capacity condensers, may be illustrated with reference to the appended drawing in which Figure 1 represents a cross-sectional view of a partially insulated electrode foil, Figure 2 represents a cross-sectional view of the foil of Figure 1, after the edge insulation has been applied, Figure 3 represents a partial cross-section of a convolutely wound condenser assembly, prior to insulation of the edges, and Figure 4 represents a partial cross-section of the condenser of Figure 3, after it has been treated in accordance with our invention.

Referring more specifically to Figure 1, 10 represents a metal electrode foil, the flat surfaces of which are coated with insulation 12 and 13. The latter, represented in the figure as inorganic, may be deposited by any of the known methods discussed previously.

Likewise, large foil strips may be coated and subsequently punched or cut to form small strips or squares suitable for stacking or rolling into small condensers. The disadvantage of this coated type of insulation lies in the fact that the edge 11 of conductor 10 is inadequately or not at all insulated. This may be attributed to the thinness of the foil (e. g. .0004") and the surface tension effect, when the coating is applied by conventional means. While the edge of insulation 12 and 13 is shown as corresponding to edge 11 of foil 10, this is not necessarily the case, and, indeed, will probably occur only when the foil is punched or cut from larger strips.

Figure 2 shows the foil of Figure 1, after it has been provided with the edge insulation, in accordance with our invention. 14 and 15 represent the metal phthalocyanine layer provided on the edge of conductor 10 by reaction of the latter with the vapors of phthalonitrile, phthalimide or the like, at about 200° C. to about 500° C., for the length of time necessary to build up a depth up to about .0002" or for the higher voltage applications, to about .0005", above which value the adherence of the insulation becomes unsatisfactory. It is to be noted that the volume occupied by the insulation is greater than that of the parent metal. This is of particular value and forms a critical feature of the invention, since it increases the length of the voltage path at the edges of the metal conductor.

The edge-insulated electrode element thus produced may be used to produce stacked or rolled condensers. If the operating voltage level of the condenser is to be relatively high, the electrode of opposite polarity may be insulated in a similar manner. However, for many purposes, an insulated and an uninsulated foil may be used as opposed electrodes, giving the maximum electrical capacity per unit of volume.

A suitable stack-type construction might utilize a copper foil of .0005" thickness, coated on each flat surface with a flexible ceramic layer .00025" thick, and another foil of aluminum of about .00025" thickness.

Figure 3 shows a rolled electrical condenser 20 in which 21 and 22 represent metal electrode foils, each coated on their flat surfaces with insulation 24. The latter may be of a resinous material, such as polytetrafluoroethylene, a silicone resin or a high melting polyisocyanate or polyamide, or may be of a flexible ceramic structure. The condenser section is wound so that the two electrode foils 21 and 22 overlap completely, thus giving maximum capacity per width of foil. The edges, however, such as the edge 23 of foil 21, are partly or wholly exposed for reasons heretofore mentioned. The terminal tab 25 is attached to foil 22, and is generally shielded during the edge treatment operation to prevent reaction.

Figure 4 shows the finished, rolled condenser, after it has been subjected to the edge treatment described above. The exposed edges of the electrode foils are insulated by a layer of metal phthalocyanine, as shown by insulation 26 on edge 23. Thus, the possibility of breakdown between foil edges is greatly reduced, or even eliminated, depending upon the voltage and other factors in the design of the condenser.

The metal phthalocyanine edge insulation of the invention is stable at 200° C. and even at higher temperatures. It resists deterioration due to corrosive atmospheres and is resistant to burning. These properties, in combination with the adherence obtained by following the instructions given herein, make the high capacity condensers of the invention useful over a wide range of temperatures and conditions, without sacrificing the volume efficiency desired.

The polytetrahaloethylene resins, with or without the use of ceramic filling materials, are preferred for the dielectric surface coatings, in conjunction with the novel edge insulation disclosed herein.

While the invention has been particularly directed to partially insulated conductors, it is contemplated that two or more strips of foil, preferably narrow, may be wound or stacked into a condenser structure and subsequently treated with the reactant vapors to produce the metal phthalocyanine over the entire surface of the foil strips, thus insulating adjacent turns of the foil from each other and producing a condenser. This can occur, as pointed out in the parent application, due to the increase in volume as the metal surface is converted into insulating material, forcing the foils somewhat apart and permitting entry of the vapor within the structure.

According to another embodiment of the invention, aluminum conductors are provided with a porous oxide film such as produced by forming aluminum (as an anode) in a bath of oxalic acid, and subsequently exposing foils or condensers employing them with the treatment described herein, whereby the aluminum surface is provided with an aluminum phthalonitrile coating. The degree and amount of penetration of the reactant vapors depends of course upon the porosity of the aluminum oxide film.

As many different embodiments of this invention may be made without departing from the spirit and scope hereof, it is to be understood that the invention is not limited to the specific embodiments hereof except as defined in the appended claims.

We claim:

1. An electrical condenser comprising two convolutely wound, metal, electrode foils, at least one of said electrode foils being insulated on the flat surfaces thereof with a coating of polytetrafluoroethylene and at the edges and corners thereof with an adherent in situ formed layer of the phthalocyanine of the metal of said foil, said layer being not greater than .0005" in thickness.

2. A process of preparaing an electrical condenser which comprises assembling a condenser section of metal electrode foils, at least one half of which bear a dielectric coating upon their flat surfaces, and then exposing said section to the vapors of a compound selected from the group consisting of phthalimide, ortho-cyano-benzo-nitriles and substituted derivatives thereof, at temperatures between about 200 and 500° C., until an adherent layer of the phthalocyanine of the metal composing said foils has been built up to a thickness of up to about .0005" at the exposed, uninsulated, metal surfaces of said foils.

3. A metal electrode foil for an electrical condenser, said foil being insulated on the flat surfaces thereof with a coating of polytetrafluoroethylene and at the edges and corners thereof with an adherent in situ formed layer of the phthalocyanine of the metal of said foil, said layer having a thickness less than about .0005".

4. A metal electrode foil for an electrical condenser, said electrode foil being insulated on the flat surfaces thereof with a coating of a high temperature resistant, high voltage breakdown dielectric of the class consisting of ceramic particles and polytetrahaloethylene, and at the edges and corners thereof with an adherent in situ formed layer of the phthalocyanine of the metal of said foil, said layer having a thickness less than about .0005".

5. An electrical condenser comprising two convolutely wound metal electrode foils, at least one of which is insulated on the flat faces thereof with a coating of ceramic particles and at the edges and corners thereof with an adherent in situ formed layer of phthalocyanine of the metal of said foil, said layer having a thickness less than about .0005".

PRESTON ROBINSON.
COLIN C. REID.

REFERENCES CITED

The following references are of record in the file of this patent:

UNITED STATES PATENTS

| Number | Name | Date |
|---|---|---|
| 2,163,768 | Tanner | June 27, 1939 |
| 2,238,031 | Brennan | Apr. 15, 1941 |
| 2,387,759 | Jarvis | Oct. 30, 1945 |
| 2,392,389 | Joyce | Jan. 8, 1946 |

FOREIGN PATENTS

| Number | Country | Date |
|---|---|---|
| 471,176 | Great Britain | Aug. 30, 1937 |